A. H. FROOM.
COMBINATION BARBECUE IRON AND GRATE.
APPLICATION FILED AUG. 5, 1920.
1,384,250.
Patented July 12, 1921.
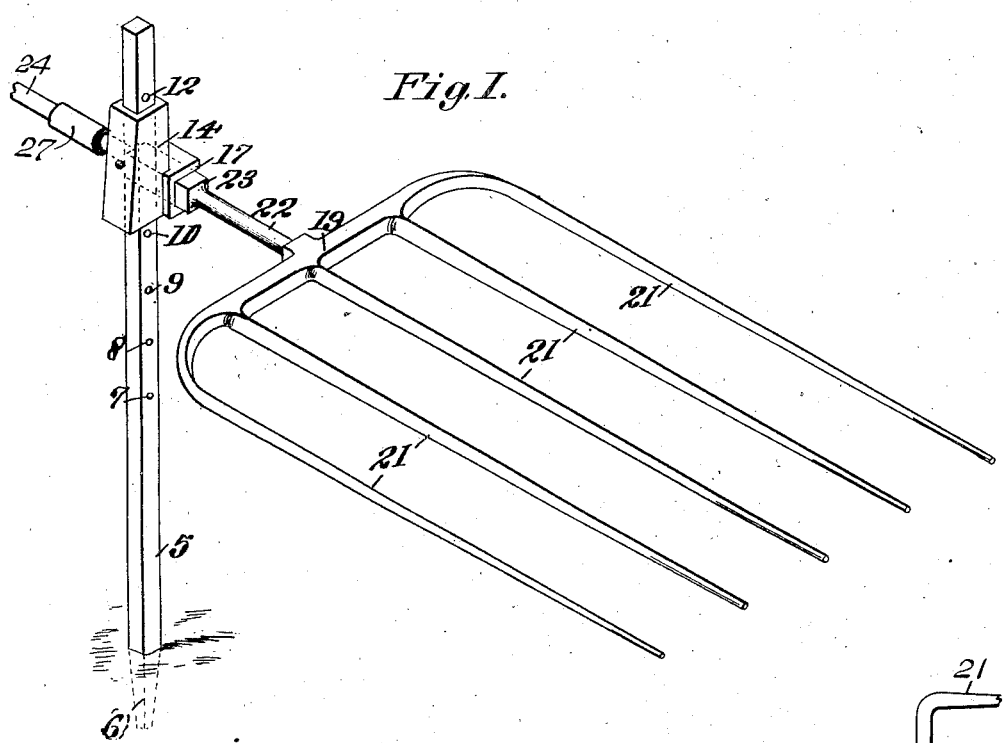
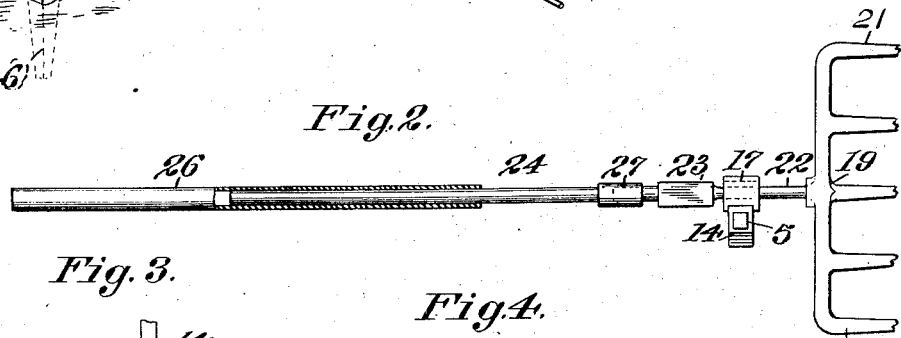
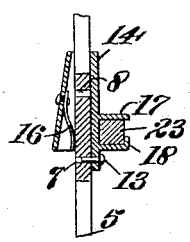
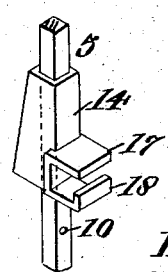
Witness.
Charles Pickles
Inventor:
A. H. Froom
By Munn & Co.
Attorneys

UNITED STATES PATENT OFFICE.

ACEL H. FROOM, OF SANTA MARIA, CALIFORNIA.

COMBINATION BARBECUE IRON AND GRATE.

1,384,250.   Specification of Letters Patent.   Patented July 12, 1921.

Application filed August 5, 1920. Serial No. 401,441.

*To all whom it may concern:*

Be it known that I, ACEL H. FROOM, a citizen of the United States, and resident of Santa Maria, in the State of California, have invented a new and useful Combination Barbecue Iron and Grate, of which the following is a specification.

The present invention relates to a new and useful improvement in a combination barbecue iron and cooking grate, and is particularly adapted for use in camping or where it is desirous of cooking meat or other edibles over an open fire. In the cooking of meat it is essential that the meat be turned often so as to keep the juices within the meat, i. e., as soon as the action of the fire upon the meat is such that the juices begin to drip, the meat should be turned so that the opposite side thereof is presented to the action of the heat, thus causing the juices to run back into the meat. This action results in a meat well cooked and very palatable.

In cooking certain vegetables it is also neccessary to present the various sides to the heat, and it is the principal object of this invention to so construct a device that the same may be manipulated so as to present all sides of the edibles cooking thereon to the action of the heat.

Another object is to construct a device of this nature that the same may be raised or lowered to take advantage of the various stages of the heat of the fire.

Another object is to construct a barbecue iron which may also be employed as a grate upon which pots and pans may be placed and be so held over the fire at any desired distance therefrom.

Another object is to construct a device of this character which will be cheap to manufacture.

Another object is to produce a barbecue iron which may be folded to facilitate easy transportation.

Other objects and advantages will be seen as the description proceeds.

I do not wish to confine myself to the specific form of combined barbecue iron and grate as shown, as other modifications may be made without departing from the spirit of the invention.

In the drawings, Figure 1 is a perspective view of my improved barbecue iron and grate as it would appear in use.

Fig. 2 is a fragmentary top plan view partly in section.

Fig. 3 is a detail view, partly in section, of the supporting slide.

Fig. 4 is a perspective view of the supporting slide.

Referring to the drawings in detail: The numeral 5 refers to a post which is adapted to be driven into the ground for which purpose a sharp point is provided as shown in dotted lines at 6. It is obvious that the same should be made of a fire resisting material such as metal.

At 7, 8, 9, 11 and 12 I have shown perforations extending through the post 5. These perforations are adapted to receive a pin 12 carried upon a suitable slide 14, which slide is adapted to move upon the post 5 and is provided, as shown at 16, with a spring which has its free end bearing against the post 5 for the purpose of normally retaining the pin 12 within one of the perforations as at 7. (See Fig. 3)

A bracket is formed integral with the slide 14 and is indicated by the numeral 17. This bracket is also shaped so as to prevent the turning of a member, to be later described, and adapted to be held by said bracket. A slot 18 is formed in one side of same, the purpose of which will be later seen.

The numeral 19 refers to the barbecue iron or grate proper, and is provided with tines 21, upon which pieces of meat or other commodities may be affixed. This iron is supported by a rod 22 extending rearwardly therefrom, and provided with a square portion 23 which is adapted to fit the interior of the bracket 17 as before mentioned. The size of the rod 22 is such that it may be passed through the slot 18 for the purpose of engaging or disengaging these parts, one from the other.

An extension handle is provided as indicated by the numerals 24 and 26, which is secured to the rod 22 as shown at 27. The operation is as follows:

The device is set up as shown at Fig. 1 and, assuming that meat is to be cooked first, the same will be placed upon the tines by passing the tines therethrough, and the slide 14 will be adjusted as best suits the heat desired. When the meat has been cooked until it starts to drip the handle 26 will be grasped and pulled toward the operator. This disengages the square part 23 from the bracket 17, as shown in Fig. 2, after which the whole iron may be turned as the round part of the rod 22 will then rest in the bracket 17. After turning, the square portion 23 is again engaged in the bracket and the opposite side of the meat is then presented to the heat.

Should it be desired to use the iron as a grate, this can be done by lowering the slide 14, which will bring the tines close to the fire, at which time pots and pans may be placed thereon.

Thus, it will be seen that I have produced a device which will serve all the purposes of both a barbecue iron and a grate, which will be cheap to construct and easy to transport.

I claim:

In a device of the character described, a post, a series of perforations therein, a slide movable vertically on said post, a pin on said slide adapted to selectively engage any one of said perforations, a spring in said slide adapted to lock said pin in said perforation, a slot of angular cross-section in said slide, a barbecue iron with a handle thereon being of partly angular and partly round cross-section and adapted to be selectively either rigidly or rotatably supported in said slot.

ACEL H. FROOM.